UNITED STATES PATENT OFFICE.

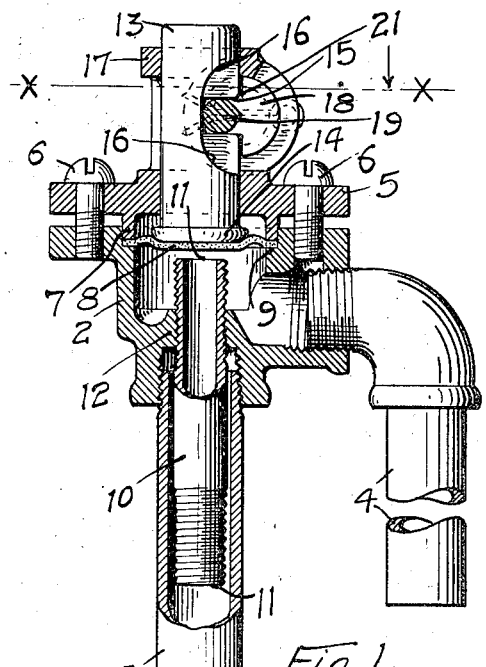
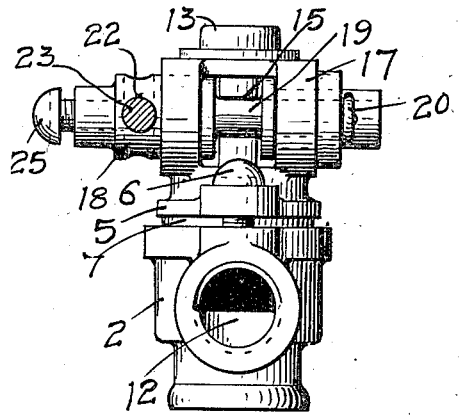
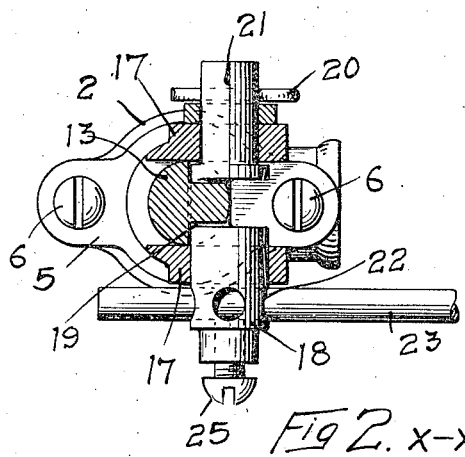
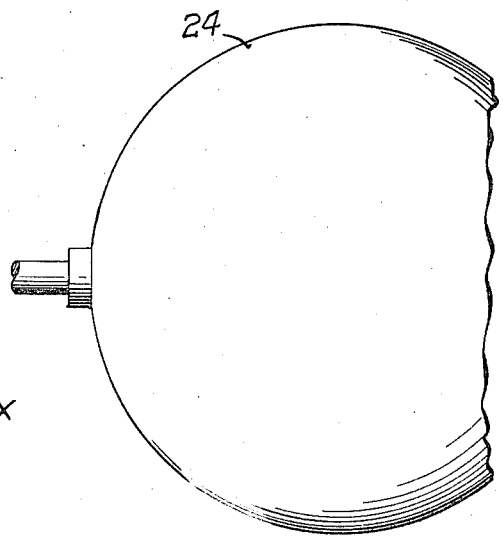

JOHN L. HAGUE, OF MINNEAPOLIS, MINNESOTA.

BALL-COCK.

1,045,399.

Specification of Letters Patent.

Patented Nov. 26, 1912.

Application filed June 27, 1911. Serial No. 635,687.

*To all whom it may concern:*

Be it known that I, JOHN L. HAGUE, a citizen of the United States, of Minneapolis, Hennepin county, Minnesota, have invented certain new and useful Improvements in Ball-Cocks, of which the following is a specification.

The object of my invention is to provide a ball cock of simple construction and one which can be easily applied to a tank and as readily removed for inspection or repairs.

A further object is to provide a ball cock of extremely durable construction and one which being composed of but few parts cannot readily get out of order.

My invention consists generally in various constructions and combinations, all as hereinafter described and particularly pointed out in the claims.

In the accompanying drawings forming part of this specification, Figure 1 is a detail sectional view of a ball cock illustrating my invention, Fig. 2 is a sectional view on the line $x$—$x$ of Fig. 1, showing the manner of mounting the float and the means for adjusting it, Fig. 3 is a side elevation of the ball cock.

In the drawing, 2 represents a casing having an intake pipe 3 and a discharge pipe 4. Upon this casing a plate 5 is mounted, secured by suitable means, such as screws 6 and having an annular flange 7 adapted to bear on the edge of a diaphragm 8 and secure it upon its seat 9. This diaphragm is capable of movement to open or close the intake opening provided in the pipe 10, which is concentric with the pipe 3. The pipe 10 preferably has each end threaded and provided with a seat 11 to receive the diaphragm, the threaded end of the pipe being screwed into a wall 12 provided in the casing 2. This pipe or nipple 10, as shown plainly in Fig. 1, telescopes with the supply pipe 3 and when the valve casing is removed from the supply pipe one end of the pipe 10 will project from the casing and an ordinary wrench may be applied thereto to remove it from the casing, for the purpose of reversing the ends of the pipe or substituting a new one in place of it. As stated, the pipe 10 is threaded at both ends and each end has a valve seat, so that when one end becomes worn or pitted the pipe may be turned end for end and used again. This arrangement of the pipe, which may have a seat at both ends or at one end only, allows its removal from the casing when the supply pipe is detached without disturbing the valve or any of the connections at the top of the valve casing. The insertion of the pipe into the casing and its removal therefrom is accomplished entirely through the underside of the valve casing. A plunger 13 has a lower end 14 adapted to bear on the diaphragm and force it down upon the seat provided at the upper end of the pipe 10, thereby shutting off the flow of water through the intake pipe. When the plunger is raised, the pressure of the water will lift the diaphragm and the water will flow into the casing and through the pipe 4 into the tank.

For the purpose of raising and lowering the plunger 13 I provide a recess 15 in its side wall with shoulders 16 formed in the plunger above and below the recess. These shoulders have curved faces, as plainly indicated in Fig. 1. The plunger 13 has bearings in the cap 5 and in standards 17 that extend upwardly from said cap and on each side of the recess 15. A rock shaft 18 has bearings at each end in the standards 17 and is provided with a centrally arranged, double crank 19 that is adapted to slip into the notch 15 when the parts are assembled. The shaft 18 is held in place by a cotter pin 20 and one end of the shaft is recessed at 21 to allow said end to pass the plunger 13 and be inserted endwise into its bearings in the standards. The double crank may be polygonal in cross section, as shown in Fig. 1, or circular, and it is prevented from passing out of the recess in the rocking of the shaft 18 by the engagement of the shaft on each side of the recess with the curved shoulders or stops 16. These stops are directly in the path of the shaft 18 at each end of the crank 19 and positively prevent rotation of the shaft to such an extent that the crank 19 will be rolled out of its recess. A socket 22 is provided in one end of the shaft to receive a rod 23 carrying the float 24 and said rod is locked by means of a set screw 25. The rise and fall of water in the tank will cause the oscillation of the rod 23 in the usual way and the rocking of the shaft 18 and the movement of he plunger into opening and closing position.

I claim as my invention:—

1. A ball cock comprising a casing having intake and discharge pipes, a plunger having a seat in said casing and provided with a transverse recess, a rock shaft having a crank fitting within said recess, said plunger also having a longitudinal recess forming a shoulder therein at one side of said transverse recess, said shaft having a part to enter said longitudinal recess and engage said shoulder to limit the rotary movement of said shaft in both directions and thereby preventing said crank from passing out of said transverse recess.

2. A ball cock comprising a casing having intake and discharge pipes, a valve plunger having a seat in said casing and provided with a transverse recess, a rock shaft having a double crank fitting within said transverse recess and adapted to raise and lower said plunger when said shaft is rocked, said plunger also having curved shoulders formed therein and said shaft having portions to engage said shoulders and limit the rotary movement of said shaft in both directions, and a float carried by said shaft.

3. A ball cock comprising a casing having a discharge pipe, a supply pipe having one end threaded into said casing, a valve mounted in said casing, a tube having one end mounted in said casing and provided with a valve seat at that end contiguous to said valve, the other end of said tube projecting outside said casing and extending into said supply pipe and having a surface adapted to receive a wrench, the separation of said supply pipe from said casing allowing access to and removal of said tube without removing said valve.

4. A ball cock comprising a casing having a discharge pipe, a supply pipe threaded into said casing, a tube threaded at each end and provided with a valve seat at each end and mounted at one end in said casing with the valve seat at that end contiguous to said valve, the other end of said tube depending within said supply pipe outside said casing and having a surface outside said casing adapted to receive a wrench when said supply pipe is disconnected from said casing, whereby said tube may be removed or turned end for end in said casing without reversing said valve.

5. A ball cock comprising a casing having intake and discharge pipes, a valve having a seat in said casing, the stem of said valve being provided with a transverse notch or recess, a shaft having a double crank and bearings therefor on each side of said recess, the crank of said shaft fitting the notch of said stem and having only a slight clearance therein, one end of said shaft having longitudinal recesses to allow the insertion of said shaft endwise into its bearings and through the notch in said stem, and means securing said shaft in said bearing.

In witness whereof, I have hereunto set my hand this 10th day of June 1911.

JOHN L. HAGUE.

Witnesses:
GENEVIEVE E. SORENSEN,
EDWARD A. PAUL.